United States Patent
Mukherjee et al.

(10) Patent No.: US 7,581,152 B2
(45) Date of Patent: Aug. 25, 2009

(54) FAULT FREE STORE DATA PATH FOR SOFTWARE IMPLEMENTATION OF REDUNDANT MULTITHREADING ENVIRONMENTS

(75) Inventors: Shubhendu S. Mukherjee, Framingham, MA (US); Robert Cohn, Salem, NH (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 11/022,600

(22) Filed: Dec. 22, 2004

(65) Prior Publication Data

US 2006/0156123 A1 Jul. 13, 2006

(51) Int. Cl.
*G01R 31/28* (2006.01)
(52) U.S. Cl. ................ 714/734; 714/733
(58) Field of Classification Search ........ 712/216–227, 712/208; 714/16, 724, 734, 733
See application file for complete search history.

(56) References Cited

U.S. PATENT DOCUMENTS

| | | | | |
|---|---|---|---|---|
| 4,701,915 | A | * | 10/1987 | Kitamura et al. ............ 714/6 |
| 5,872,910 | A | * | 2/1999 | Kuslak et al. ............. 714/41 |
| 5,923,863 | A | * | 7/1999 | Adler et al. .............. 712/216 |
| 6,772,368 | B2 | * | 8/2004 | Dhong et al. ............. 714/11 |
| 6,912,648 | B2 | * | 6/2005 | Hammarlund et al. ..... 712/219 |
| 7,047,397 | B2 | * | 5/2006 | Segelken .................. 712/221 |
| 7,243,262 | B2 | | 7/2007 | Mukherjee |
| 7,308,607 | B2 | | 12/2007 | Reinhardt |
| 7,353,365 | B2 | | 4/2008 | Mukherjee |
| 7,370,231 | B2 | | 5/2008 | Fossum |
| 7,373,548 | B2 | | 5/2008 | Reinhardt |
| 7,386,756 | B2 | | 6/2008 | Emer |
| 7,444,497 | B2 | | 10/2008 | Reinhardt |
| 7,472,299 | B2 | | 12/2008 | Mukherjee |
| 7,475,321 | B2 | | 1/2009 | Gurumurthi |
| 2001/0037448 | A1 | * | 11/2001 | Mukherjee et al. .......... 712/244 |
| 2005/0193283 | A1 | | 9/2005 | Reinhardt |
| 2005/0283590 | A1 | | 12/2005 | Weaver |
| 2005/0283712 | A1 | | 12/2005 | Mukherjee |
| 2005/0283716 | A1 | | 12/2005 | Mukherjee |
| 2006/0143551 | A1 | | 6/2006 | Biswas |
| 2006/0150048 | A1 | | 7/2006 | Echeruo |
| 2007/0011513 | A1 | | 1/2007 | Biswas |
| 2007/0022348 | A1 | | 1/2007 | Racunas |
| 2007/0168712 | A1 | | 7/2007 | Racunas |
| 2007/0234307 | A1 | | 10/2007 | Luk |

(Continued)

OTHER PUBLICATIONS

"Transient fault detection via simultaneous multithreading" by Reinhardt et al. Proceedings of 27th International Symposium on Computer Architecture (IEEE Cat. No. RS00201) p. 25-36 Jun. 2000 ISBN: 1 58113 232 8.*

(Continued)

*Primary Examiner*—Cynthia Britt
(74) *Attorney, Agent, or Firm*—Erik R. Nordstrom

(57) ABSTRACT

A method for a fault free store data path in a software implementation of redundant multithreading environments is described. In one embodiment, after a check is performed by a hardware/software checker, the processor still needs to ensure that the data just checked reaches protected memory without any faults. The present implementation provides sufficient redundant information along the path of a store from register read to commit, such that it may detect any single bit upset error in the path.

43 Claims, 6 Drawing Sheets

U.S. PATENT DOCUMENTS

2007/0283195 A1   12/2007   Reinhardt
2008/0052691 A1    2/2008   Neelakantam
2008/0163010 A1    7/2008   Racunas
2008/0239793 A1   10/2008   Burleson

OTHER PUBLICATIONS

Shubhendu S. Mukherjee, Michael Kontz, and Steven K. Reinhardt, "Detailed Design and Evaluation of Redundant Multithreading Alternatives," Proc. 29th Intl Symp. On Computer Architecture, May 2002.

Namsuk Oh, P. Shirvani, and Ed McCluskey, "Control Flow Checking by Software Signatures," IEEE Transactions on Reliability, Dec. 2001.

Namsuk Oh, P. Shirvani, and Ed McCluskey, "EDDI: Error Detection by Duplicated Instructions in Superscalar Processors," IEEE Transactions on Reliability, Dec. 2001.

Nahmsuk Oh, Subhasish Mitra, and Ed McCluskey, "ED4I: Error Detection by Diverse Data and Duplicated Instructions," IEEE Transactions on Computers, vol. 51, No. 2, Feb. 2002.

Steven K. Reinhardt and Shubhendu S. Mukherjee, "Transient Fault Detection via Simultaneous Multithreading," Proc. 27th Intl Symp. On Computer Architecture, Jun. 2000.

Kent Wilken and John Paul Shen, "Continuous Signature Monitoring: Low-Cost Concurrent Detection of Processor Control Errors," IEEE Transactions on Computer-Aided Design, vol. 9, No. 6, Jun. 1990 (Abstract provided).

Daniel P. Siewiorek and Robert S. Swarz, "Reliable Computer Systems: Design and Evaluation," A.K. Peters Ltd, Oct. 1998; Chapter 8, pp. 586- 648.

Kent Wilken and John Paul Shen, "Continuous Signature Monitoring: Low-Cost Concurrent Detection of Processor Control Errors," IEEE Transactions on Computer-Aided Design, vol. 9, No. 6, Jun. 1990.

* cited by examiner

FAULT FREE STORE DATA PATH FOR SOFTWARE IMPLEMENTATION OF REDUNDANT MULTITHREADING ENVIRONMENTS

BACKGROUND INFORMATION

Current redundant-execution systems commonly employ a hardware checker circuit that is self-checking. Similar to the hardware checker, in software, is the compare instruction. The compare instruction compares the results from two threads (e.g., store address and data). It may be possible to duplicate the compare instruction in both threads to get the effect of self-checking via duplication.

Unfortunately, by duplicating the compare instruction the architecture would lose the performance advantage of redundant multithreading (RMT). RMT's performance advantage comes from having the leading and trailing threads sufficiently apart such that the leading thread can prefetch cache misses and branch mispredictions for the trailing thread. If the compare instruction is duplicated, not only are additional queues needed, incurring higher overhead, but also the architecture would be unable to keep the two threads sufficiently apart because of the synchronization required in both directions.

The hardware checker instruction ensures a self-checking checker. However, after the check is performed, the processor still needs to ensure that the data just checked reaches protected memory without a fault. Current software does not have visibility into the processor to that level of detail. Thus, without hardware support, the software is not able to ensure that the checked data path proceeds to protected memory without a fault.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

Throughout the specification, the term, "instruction" is used generally to refer to instructions, macro-instructions, instruction bundles or any of a number of other mechanisms used to encode processor operations.

Figure 1:
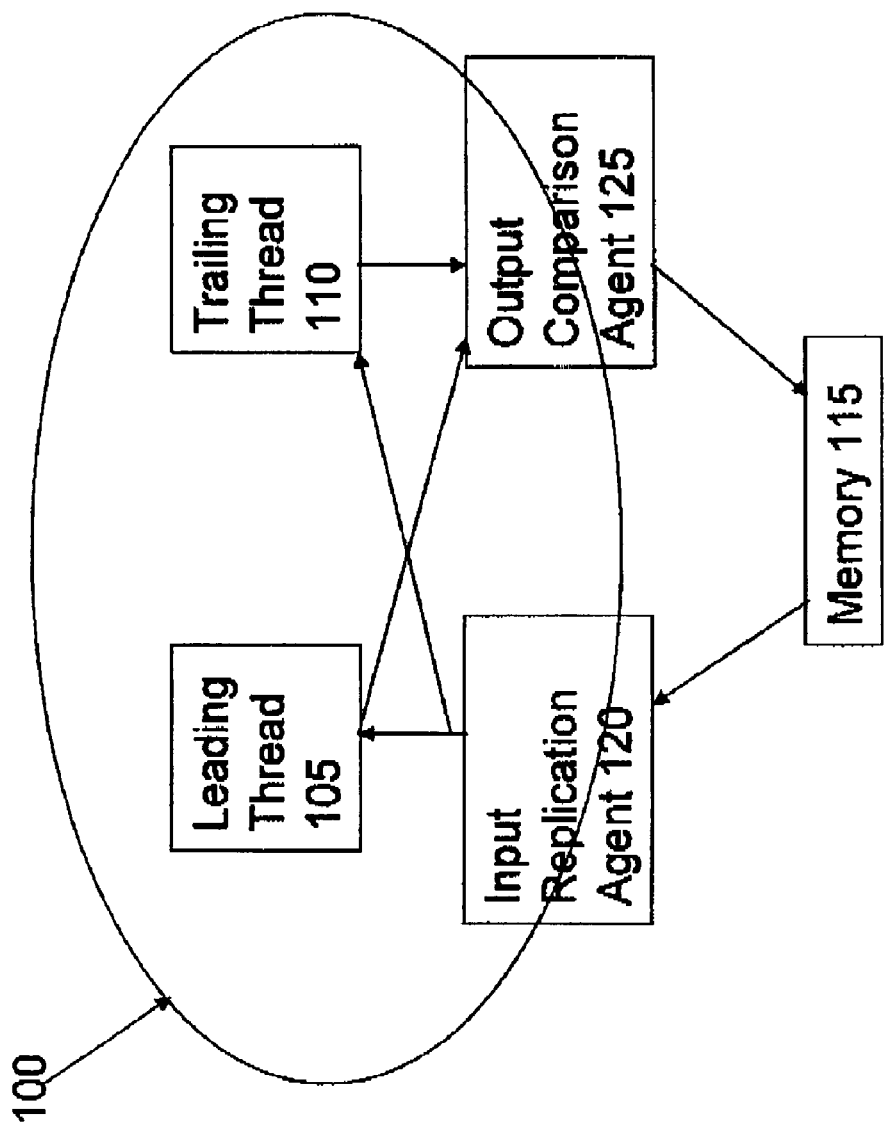
FIG. 1 is a block diagram of one embodiment of a redundantly multithreaded architecture.

FIG. 1 is a block diagram of one embodiment of a redundantly multithreaded architecture. In a redundantly multithreaded architecture faults can be detected by executing two copies of a program as separate threads. Each thread is provided with identical inputs and the outputs are compared to determine whether an error has occurred. Redundant multithreading can be described with respect to a concept referred to herein as the "sphere of replication." The sphere of replication is the boundary of logically or physically redundant operation.

Components within the sphere of replication 100 (e.g., a processor executing leading thread 105 and a processor executing trailing thread 110) are subject to redundant execution. In contrast, components outside sphere of replication 100 (e.g., memory 115) are not subject to redundant execution. Fault protection is provided by other techniques, for example, error correcting code for memory 115. Other devices may be outside of sphere of replication 100 and/or other techniques may be used to provide fault protection for devices outside of the sphere of replication 100.

Data entering sphere of replication 100 enter through input replication agent 120 that replicates the data and sends a copy of the data to leading thread 105 and to trailing thread 110. Similarly, data exiting sphere of replication 100 exit through output comparison agent 125 that compares the data and determines whether an error has occurred. Varying the boundary of sphere of replication 100 results in a performance versus amount of hardware tradeoff. For example, replicating memory 115 would allow faster access to memory by avoiding output comparison of store instructions, but would increase system cost by doubling the amount of memory in the system.

Since RMT compares outputs of committed instructions (requiring instruction-by-instruction comparison), it may also be implemented in software. If the software implementation of RMT compared every instruction, it would incur significant overhead. Instead, however, RMT allows the comparison of only store instructions and replication of only load instructions, which may significantly reduce the software overhead of a RMT implementation.

Figure 2:
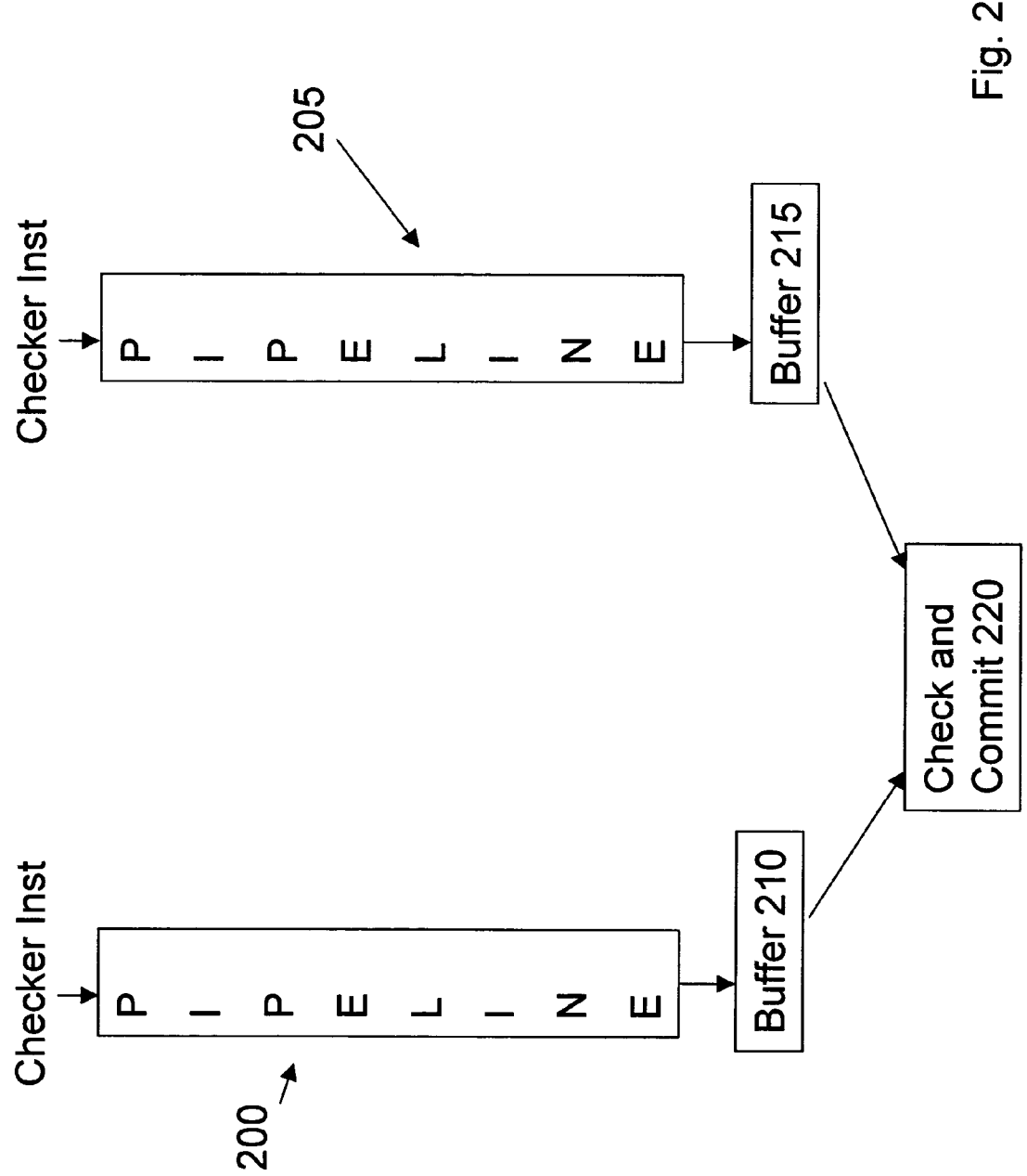
FIG. 2 is block diagram of one embodiment of a checker instruction.

FIG. 2 is a block diagram of one example of a checker instruction flowing through two pipelines. Assuming a store instruction involving registers R1, R2 (not shown): R1→[R2], stores the value in register R1 to the memory location pointed by the address in register R2. This store instruction may be replicated in both the leading thread and the trailing thread with the checker irisiruction. The store instruction in the leading thread may include both the checker instruction and the store instruction as shown below:

Checkerinst R1
Checkerinst R2
Store: R1→[R2]. Thus, the leading thread may contain the checker instruction along with the store instruction when traveling through its pipeline 200.

The store instruction in the trailing thread may include only the checker instruction as shown below:

Checkerinst R1
Checkerinst R2. Thus, the trailing thread does not have the store instruction traveling through its pipeline 205.

The checkerinst R1 from the leading thread in pipeline 200 waits for peer checker instruction in buffer 210. The checkerinst R1 from the trailing thread in pipeline 205 waits for it peer checker instruction in buffer 215. The checker instruction always looks or waits for its counterpart or peer. If there is a mirror thread, the checker instruction will look or wait for the thread in the buffers 210, 205 to make sure the mirror thread is there and then compares the checker instructions.

The checkerinst R1 from the leading thread and checkerinst R1 from the trailing thread may pair up, due to commit order, and compare the register specifier and value of R1 to ensure that the registers did not have any errors in them. If no errors are found, the checker instructions commit 220. Once the checker instructions commit, the value of R1 is stored. The value of R1 is carried through to the commit point and then stored. Thus, the system is able to check all the stores simultaneously instead store by store as done previously.

The hardware checker instruction ensures a self-checking checker as described above in FIG. 2. However, after the check is performed, the system may still need to ensure that the data just checked reaches protected memory without any faults. In one embodiment, the system may provide a "radhard" store path that is immune to single bit upsets. For purposes of this disclosure, "rad-hard" means the path has been hardened to prevent failures from radiation effects. Since software does not have visibility into the path, a software implementation of RMT may not be able to detect soft errors on this path. Thus, the current embodiment provides sufficient redundant information along the path of the store from register read to commit, such that it may detect any single bit upset error in the path.

A solution to ensure that data just checked reaches memory without any faults depends on the type of store instruction available in current instruction sets. Typically, current processors have two types of stores:

First, Store [R1]←R3, in the IA-64 instruction set. The IA-64 store instruction does not have any effective address computation to compute the address of the store itself.

Second, Store [R1+R2]←R3, in the IA-32 or Alpha instruction set. The IA-32 instruction set may do an effective address computation to create the address where the store is sending the data in R3.

With respect to the IA-64 mechanism, the checkerinst previously discussed in FIG. 2, guarantees that the data in R1 and R3 are correct. However, it cannot guarantee that the store path, from register read of R1 and R3, till the store commit point is error free.

Figure 3:
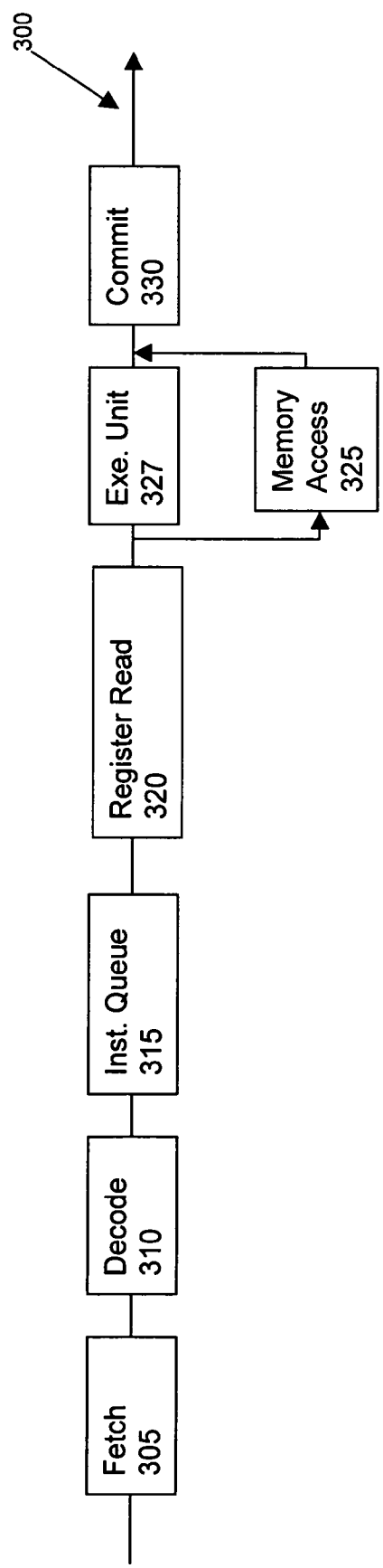
FIG. 3 is a block diagram of one embodiment of an IA-64 pipeline.

FIG. 3 illustrates one embodiment supporting a store path, from register read to commit point, being error free for an IA-64 instruction set. Since the store address in R1 and data in R3 do not change from register read till store commit point, the processor may simply protect R1 and R3 using parity (for detection) or ECC (for recovery). In an IA-64 instruction set, the effective address is already in the registers and does not need to be computed as it flows through the pipeline.

Referring now to FIG. 3, in pipeline 300, the store instruction reads the address register and the data register 305 and decodes 310. Next, the instruction issues from the instruction queue 315. The control portion of the store queue includes checker bits, which may be either parity or ECC. The checker bits flow with the control portion of the store instruction through the pipeline.

The data portion of the store reads the register file 320. When the store reads the registers it may generate its own parity or ECC. Alternatively, many register files today already have their own parity or ECC and the store may not need to generate its own parity or ECC. If the register file already has parity or ECC, then the store instruction reads the parity/ECC off of the registers. The parity or ECC information is carried forward through the memory system 325, including the store data queues. The control and data portions flow along the pipeline 300 until it commits 330. In an IA-64 instruction set, the address is already computed prior to the store, therefore, the store does not flow through the execution unit 327.

Eventually when the store commits, and writes the data into either a coalescing merge buffer or cache directly, it may check the parity or ECC for R1 and R3. Thus, the system may now be able to catch an error in the store data path for a software implementation of RMT.

Figure 4:
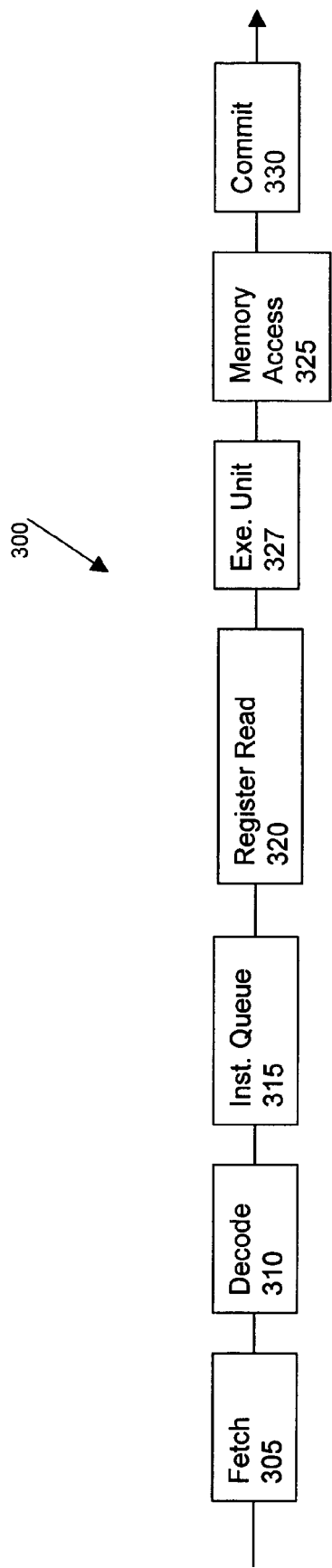
FIG. 4 is a block diagram of one embodiment of a non-IA64 pipeline.

FIG. 4 illustrates one embodiment supporting a store path, from register read to commit point, being error free for a non-IA64 instruction set. Most architectures, except for IA-64, enable a processor to recompute the thread in the ALU itself. The addressing mode, from a store, enables the processor to specify an offset and a second value. In the ALU, the processor may add these two to generate an effective address where the data has been stored. However, since the processor is performing the computation in the ALU, the data is changing as it flows down the pipeline.

Parity or ECC is not easy to use to protect these types of stores because the store needs to run through the execution units to compute its effective address. Since the data changes as it flows down the pipeline, the processor cannot carry the parity or ECC along the store path and expect to check it for correctness before committing. This is because the parity or ECC has to be regenerated every time.

Now, referring to FIG. 4, when a store instruction is read 305, the store is duplicated in the decode unit 310. When the store is decoded, the processor creates two stores, first, the original store and second, a pseudo store. The pseudo store is generated in hardware with no software visibility.

Both the original store and the pseudo store are specially tagged and located in the leading thread. The pseudo store may follow the original store's normal dependence rules, but it may not have any instruction depend upon it. Since the pseudo store follows the original store in program order, the original store may not be allowed to retire before the pseudo store.

Both stores proceed down the pipeline 300 and eventually enter the instruction queue 315. Next, the instruction issues from the instruction queue 315 and the control portion of the store queue includes checker bits, which may be either parity or ECC. The checker bits flow with the control portion of the store instruction through the pipeline 300.

The data portion of the store reads the register file 320. When the store reads the registers it may generate its own parity or ECC. Alternatively, many register files today already have their own parity or ECC and the store may not need to generate its own parity or ECC. If the register file already has parity or ECC, then the store instruction reads the parity/ECC off of the registers. The parity or ECC information is carried forward through the execution unit 327, including the store data queues. In this instance, the store flows through the execution unit 327 because it has to compute the address. Next, the instruction flows through memory 325 with the ECC and parity. The control and data portions flow along the pipeline until it commits 330.

Figure 5:
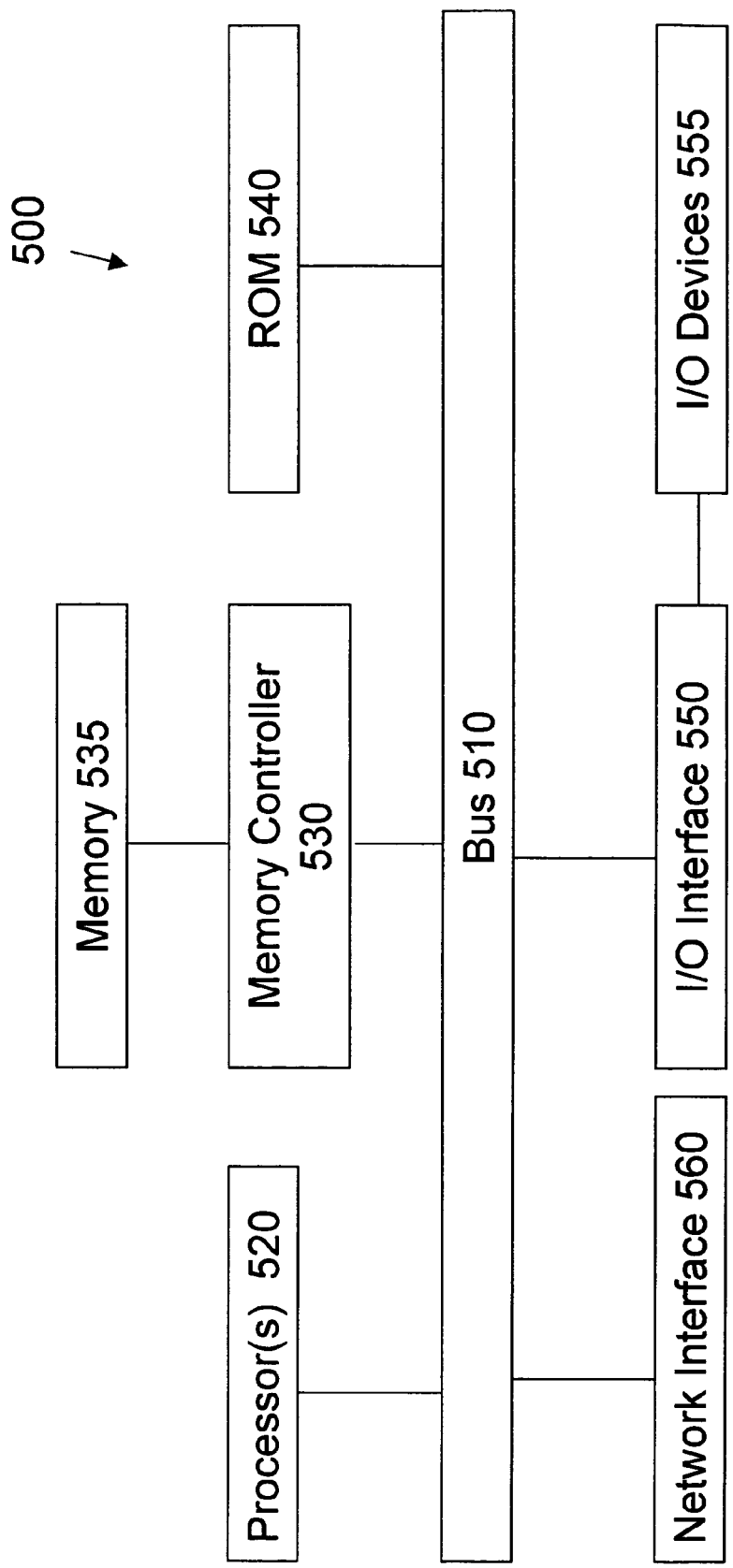
FIG. 5 is a block diagram of a system that may provide an environment for multithreaded processors.

FIG. 5 is a block diagram of a system that may provide an environment for a fault free store data path for software implementation of RMT. The system illustrated in FIG. 5 is intended to represent a range of systems. Alternative systems may include more, fewer and/or different components.

System 500 includes bus 510 or other communication device to communicate information, and processor(s) 520 coupled to bus 510 to process information. System 500 further includes random access memory (RAM) or other dynamic memory as well as static memory, for example, a hard disk or other storage device 535 (referred to as memory), couple to bus 510 via memory controller 530 to store information and instructions to be executed by processor(s) 520. Memory 535 also can be used to store temporary variables or other intermediate information during execution of instructions by processor(s) 520. Memory controller 530 can include one or more components to control one or more types of memory and/or associated memory devices. System 500 also includes read only memory (ROM) and/or other static storage device 540 coupled to bus 510 to store static information and instructions for processor(s) 520.

System 500 can also be coupled via a bus 510 to input/output (I/O) interface 550. I/O interface 550 provides an interface to I/O devices 555, which can include, for example, a cathode ray tube (CRT) or liquid crystal display (LCD), to display information to a computer user, an alphanumeric input device including alphanumeric and other keys and/or a cursor control device, such as a mouse, a trackball, or cursor direction keys. System 500 further includes network interface 560 to provide access to a network, such as a local area network, whether wired or wireless.

Instructions are provided to memory 535 from a storage device, such as magnetic disk, a read-only memory (ROM) integrated circuit, CD_ROM, DVD, via a remote connection (e.g., over a network via network interface 560) that is either wired or wireless, etc.

Figure 6:
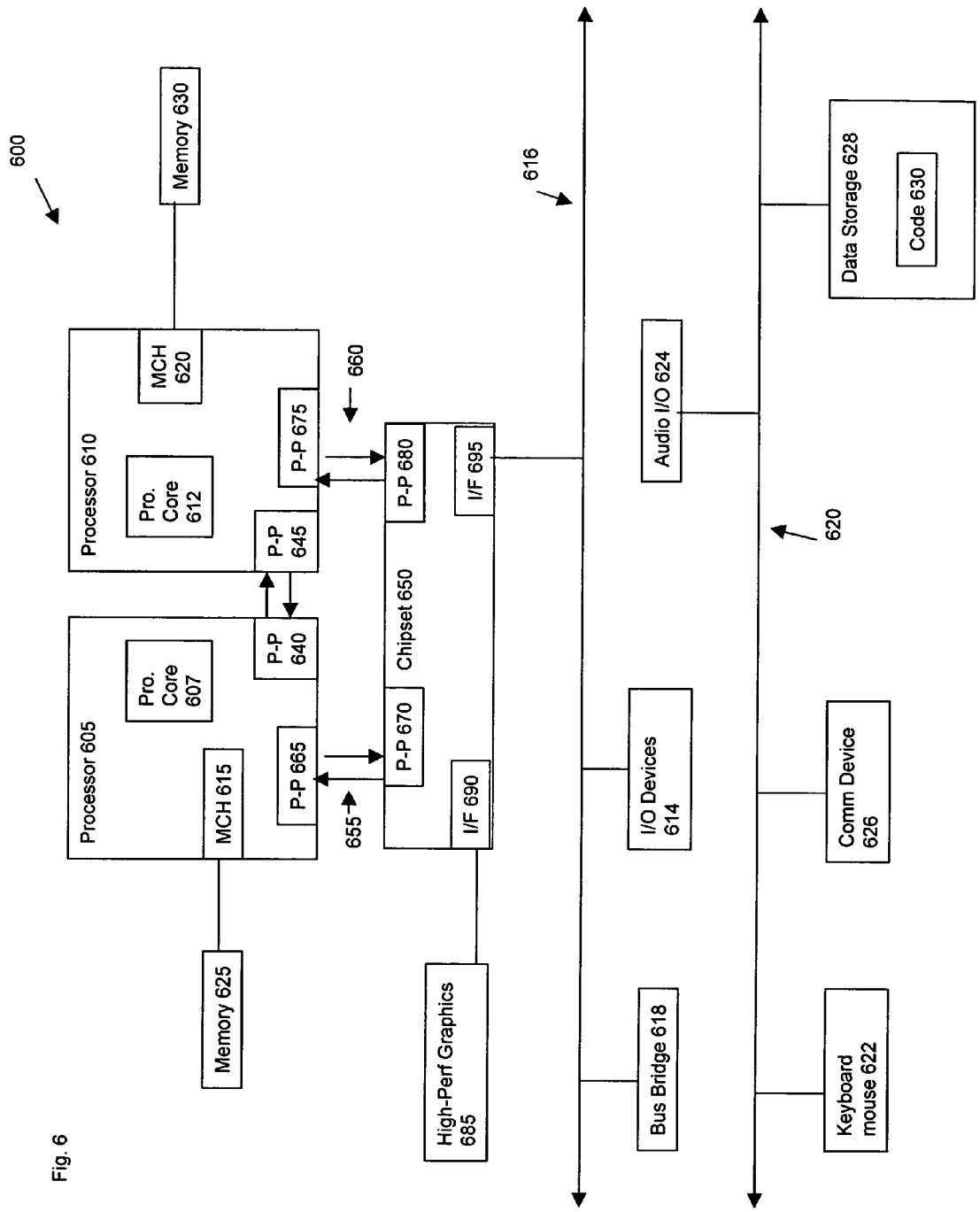
FIG. 6 is a block diagram of an alternative system that may provide an environment for multithreaded processors.

Referring now to FIG. 6, the system 600 includes processors supporting a fault free store data path for software implementation of RMT. The system 600 generally shows a system where processors, memory, and input/output devices are interconnected by a number of point-to-point interfaces. The system 600 may also include several processors, of which only two, processors 605, 610 are shown for clarity. The processors 605, 610 may contain processor cores 607, 612. Processors 605, 610 may each include a local memory controller hub (MCH) 615, 620 to connect with memory 625, 630. Processors 605, 610 may exchange data via a point-to-point interface 635 using point-to-point interface circuits 640, 645. Processors 605, 610 may each exchange data with a chipset 650 via individual point-to-point interfaces 655, 660 using point to point interface circuits 665, 670, 675, 680. Chipset 650 may also exchange data with a high-performance graphics circuit 685 via a high-performance graphics interface 690.

The chipset 650 may exchange data with a bus 616 via a bus interface 695. In either system, there may be various input/output I/O devices 614 on the bus 616, including in some embodiments low performance graphics controllers, video controllers, and networking controllers. Another bus bridge 618 may in some embodiments be used to permit data exchanges between bus 616 and bus 620. Bus 620 may in some embodiments be a small computer system interface (SCSI) bus, an integrated drive electronics (IDE) bus, or a universal serial bus (USB) bus. Additional I/O devices may be connected with bus 620. These may include keyboard and cursor control devices 622, including mouse, audio I/O 624, communications devices 626, including modems and network interfaces, and data storage devices 628. Software code 630 may be stored on data storage device 628. In some embodiments, data storage device 628 may be a fixed magnetic disk, a floppy disk drive, an optical disk drive, a magneto-optical disk drive, a magnetic tape, or non-volatile memory including flash memory.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A method comprising:
   checking at least a portion of an instruction in a redundant multi-threaded (RMT) process; and
   providing a path immune to single bit upsets for the instruction to transfer the instruction after having been checked (checked instruction) from a RMT sphere of redundancy to protected memory outside of the sphere, said act of providing comprising:
      obtaining the checked instruction from a pipeline;
      issuing the checked instruction;
      reading an error bit from a register;
      committing the checked instruction with the error bit; and
      determining if an error occurred in a path of the pipeline for the checked instruction.

2. The method of claim 1 wherein the issuing of instruction further comprising issuing a control portion and data portion of the instruction.

3. The method of claim 2 further comprising generating checker bits for control portion of the instruction.

4. The method of claim 3 wherein the generating of checker bits includes generating error bits.

5. The method of claim 3 wherein the checker bits for the control portion of the instruction flows with the instruction through the pipeline.

6. The method of claim 5 wherein the reading error bit from a register includes the data portion of the instruction reading the error bit.

7. The method of claim 6 further comprising generating error bits by the data portion of the instruction in the register.

8. The method of claim 6 further comprising generating error bits by the register.

9. The method of claim 6 further comprising control and data portions of the instruction flowing through the pipeline with their own error bits.

10. The method of claim 9 wherein the determining if error occurred further comprising comparing the error bits.

11. The method of claim 10 wherein the instruction is from an IA-64 instruction set.

12. The method of claim 9 further comprising decoding the instruction.

13. The method of claim 12 wherein the decoding of the instruction further comprises duplicating the instruction.

14. The method of claim 13 wherein the duplicating the instruction further comprises creating a first instruction and a second instruction.

15. The method of claim 14 wherein the creating a first and second instruction further comprises tagging the first and second instructions.

16. The method of claim 14 wherein the creating the first and second instructions further comprises creating the first and second instructions in a leading thread.

17. The method of claim 14 further comprising flowing the first and second instructions through the pipeline.

18. The method of claim 14 further comprising flowing the first and second instructions through an execution unit in the pipeline.

19. The method of claim 18 further comprising computing an effective address for the first and second instructions.

20. The method of claim 19 wherein the determining if error occurred in data path further comprises comparing the first and second instructions.

21. The method of claim 20 further comprising writing the instruction into memory if no error.

22. The method of claim 20 wherein the instruction is from a non-IA64 instruction set.

23. The method of claim 1 wherein the instruction is a store instruction.

24. A processor comprising:
   a path, immune to single bit upsets, to receive a checked instruction from a redundant multi-threaded (RMT) process and to transfer the checked instruction from a RMT sphere of redundancy to protected memory outside of the sphere, said store path comprising:
      a decode unit to decode the checked instruction;
      an instruction queue, coupled to the decode unit, to issue the checked instruction, wherein the instruction queue issues a first portion and a second portion of the checked instruction; and
      a commit unit, coupled to the instruction queue, wherein the first and second portion of the checked instruction commit with error bits.

25. The processor of claim 24 further comprising a fetch unit, coupled to the decode unit, issues the instruction.

26. The processor of claim 25 wherein the first portion of the instruction includes error bits that flow in the pipeline.

27. The processor of claim 26 further comprising a register coupled to the instruction queue, where the second portion of the instruction reads the register.

28. The processor of claim 27 wherein the second portion generates error bits carried through the pipeline with the second portion of the instruction.

29. The processor of claim 28 wherein the first and second portions of the instruction flow through memory, wherein the memory is coupled to the register.

30. The processor of claim 29 wherein the decode unit generates an original instruction and a pseudo instruction.

31. The processor of claim 30 wherein the original and pseudo instructions are located in a leading thread.

32. The processor of claim 31 wherein the leading thread tags the original and pseudo instructions.

33. The processor of claim 30 further comprising an execution unit, coupled to the register, wherein the execution unit generates an address for the original and pseudo instructions.

34. The processor of claim 33 wherein the commit unit commits both the original and pseudo instructions.

35. The processor of claim 24 wherein the instruction is a store instruction.

36. A system comprising:
   a first processor comprising:
      a path, immune to single bit upsets, to couple a checked instruction in a redundant multi-threaded process to a protected destination, said path comprising:
         a decode unit to decode the checked instruction;
         an instruction queue, coupled to the decode unit, to issue the instruction, wherein the instruction queue issues a first portion and a second portion of the instruction; and
         a commit unit, coupled to the instruction queue, wherein the first and second portion of the instructions commit with error bits;
      a first interface to a second processor;
      a second interface coupled to input/output devices; and
      an audio input/output device coupled to the second interface.

37. The system of claim 36 wherein the first and second interfaces are point to point interfaces.

38. The system of claim 36 wherein the first portion of the instruction includes error bits that flow in the pipeline.

39. The system of claim 38 further comprising a register coupled to the instruction queue, where the second portion of the instruction reads the register.

40. The system of claim 39 wherein the second portion generates error bits carried through the pipeline with the second portion of the instruction.

41. The system of claim 40 wherein the decode unit generates an original instruction and a pseudo instruction.

42. The system of claim 41 further comprising an execution unit, coupled to the register, wherein the execution unit generates an address for the original and pseudo instructions.

43. The system of claim 42 wherein the commit unit commits both the original and pseudo instructions.

* * * * *

UNITED STATES PATENT AND TRADEMARK OFFICE
CERTIFICATE OF CORRECTION

PATENT NO. : 7,581,152 B2 Page 1 of 1
APPLICATION NO. : 11/022600
DATED : August 25, 2009
INVENTOR(S) : Mukherjee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this

Fourteenth Day of September, 2010

David J. Kappos
*Director of the United States Patent and Trademark Office*